(12) United States Patent
Zhang et al.

(10) Patent No.: US 11,993,523 B2
(45) Date of Patent: May 28, 2024

(54) MICROPORE ULTRASONIC DISINTEGRATION DEVICE FOR SLUDGE CELL DISINTEGRATION

(71) Applicant: South China Institute of Environmental Sciences, MEE, Guangzhou (CN)

(72) Inventors: Mingyang Zhang, Guangzhou (CN); Xiaoying Hu, Guangzhou (CN); Zhenhan Duan, Guangzhou (CN); Lvmeng Ye, Guangzhou (CN); Jianwei Du, Guangzhou (CN)

(73) Assignee: South China Institute of Environmental Sciences, MEE, Guangzhou (CN)

( * ) Notice: Subject to any disclaimer, the term of this patent is extended or adjusted under 35 U.S.C. 154(b) by 0 days.

(21) Appl. No.: 18/367,766

(22) Filed: Sep. 13, 2023

(65) Prior Publication Data

US 2024/0116794 A1  Apr. 11, 2024

(30) Foreign Application Priority Data

Oct. 10, 2022  (CN) .......................... 202211235008.7

(51) Int. Cl.
*C02F 11/15* (2019.01)
*B01F 27/906* (2022.01)
(Continued)

(52) U.S. Cl.
CPC ............ *C02F 11/15* (2019.01); *B01F 27/906* (2022.01); *B01F 27/91* (2022.01); *B01F 33/83* (2022.01);
(Continued)

(58) Field of Classification Search
None
See application file for complete search history.

(56) References Cited

FOREIGN PATENT DOCUMENTS

WO    WO-03086989 A1 * 10/2003 .............. B01J 19/10

OTHER PUBLICATIONS

The State Intellectual Property Office of People's Republic of China; Notification to Grant Patent Right for Invention issued in Chinese Patent Application No. 202211235008.7 on Nov. 21, 2022; 3 pages.

* cited by examiner

*Primary Examiner* — Chester T Barry
(74) *Attorney, Agent, or Firm* — Thompson Hine LLP (57) ABSTRACT

A micropore ultrasonic disintegration device for sludge cell disintegration is provided, including an ultrasonic treatment chamber. The ultrasonic treatment chamber is internally provided with a first stirring mechanism which includes a reciprocating lead screw. One end of the reciprocating lead screw penetrates through a top surface of the ultrasonic treatment chamber, and the other end of the reciprocating lead screw is provided with stirring blades. The ultrasonic treatment chamber is internally provided with a second stirring mechanism, a side wall of the ultrasonic treatment chamber is provided with a first opening, and an inner wall of the ultrasonic treatment chamber is provided with a switch mechanism. The switch mechanism includes a baffle plate and a second connecting rod. The side wall of the ultrasonic treatment chamber is provided with an ultrasonic generator, and the top surface of the ultrasonic treatment chamber is provided with a liquid inlet pipe.

3 Claims, 4 Drawing Sheets

(51) Int. Cl.
*B01F 27/91* (2022.01)
*B01F 33/80* (2022.01)
*B01F 33/83* (2022.01)
*C02F 11/14* (2019.01)
*B01F 101/00* (2022.01)

(52) U.S. Cl.
CPC .......... *B01F 33/8361* (2022.01); *C02F 11/14* (2013.01); *B01F 2101/305* (2022.01); *B01F 2215/0422* (2013.01); *C02F 2303/06* (2013.01)

MICROPORE ULTRASONIC DISINTEGRATION DEVICE FOR SLUDGE CELL DISINTEGRATION

CROSS-REFERENCE TO RELATED APPLICATION

This patent application claims the benefit and priority of Chinese Patent Application No. 202211235008.7 filed with the China National Intellectual Property Administration on Oct. 10, 2022, the disclosure of which is incorporated by reference herein in its entirety as part of the present application.

TECHNICAL FIELD

The present disclosure relates to the technical field of sludge purification, and in particular to a micropore ultrasonic disintegration device for sludge cell disintegration.

BACKGROUND

With people's increasing emphasis on environmental protection, the number of sewage treatment plants has gradually increased, and the volume of sludge accompanying sewage treatment has also increased day by day. The sludge produced after industrial wastewater and domestic sewage treatment has a moisture content of nearly 98%, is easily decayed, has a strong odor, and contains various pollutants, and the treatment cost for such sludge is particularly high, which leads to the direct discharge of sludge from some sewage plants, and has a serious impact on the ecological environment. Therefore, the development of a new sludge treatment process to improve the dewatering rate of sludge and promote subsequent biological treatment has become the key to solve the sludge problem.

By using high-power ultrasonic waves, the sludge can be degraded, the moisture content of the sludge can be reduced, and the microbes inside the sludge can be killed. By using the "cavitation" effect produced by high-power ultrasonic waves, the larger sludge particles are broken into small-sized sludge particles. The longer the ultrasonic treatment time is, the smaller the particle size becomes. A spongy effect produced by the ultrasonic waves on the sludge makes it easier for water to pass through channels created by wave propagation, such that the small-sized sludge particles can be agglomerated into flocs. When increasing to a certain extent, the flocs will do thermal motion to collide and bond with each other and are finally settled. When used to treat the sludge, the ultrasonic waves cause local heating, interface damage, disturbance and cavitation, such that the wall of microbial cells in the sludge can be broken, solid-liquid separation is accelerated, and the dewatering performance of the sludge is improved.

The sludge cell ultrasonic disintegration device in the prior art usually only uses ultrasonic waves to perform disintegration treatment on the sludge cell, or only stirs the sludge in one direction during the sludge cell disintegration process, leading to insufficient disintegration treatment of some sludge cells. Therefore, a micropore ultrasonic disintegration device for sludge cell disintegration is now needed.

SUMMARY

To solve the technical problem above, a micropore ultrasonic disintegration device for sludge cell disintegration is provided.

The technical solution provided by the present disclosure is as follows: A micropore ultrasonic disintegration device for sludge cell disintegration includes an ultrasonic treatment chamber. The ultrasonic treatment chamber is internally provided with a first stirring mechanism, and a driving mechanism is provided on an outer top surface of the ultrasonic treatment chamber. The first stirring mechanism includes a reciprocating lead screw provided in a vertical direction, one end of the reciprocating lead screw penetrates through a top surface of the ultrasonic treatment chamber and is connected to an output shaft of the driving mechanism, and an other end of the reciprocating lead screw is provided with multiple stirring blades. A first slider is sleeved on the reciprocating lead screw for sliding up and down in cooperation with the reciprocating lead screw.

The ultrasonic treatment chamber is internally provided with a second stirring mechanism. The second stirring mechanism includes a connecting block fixedly provided on an inner top surface of the ultrasonic treatment chamber. The connecting block is provided with two slide rods which are symmetrically arranged with the reciprocating lead screw as a symmetric axis. Each slide rod is arranged at an include angle of 30° with the reciprocating lead screw, and a second slider is sleeved on the slide rod.

A first connecting rod is fixedly provided on the first slider in a horizontal direction, two second sliders are connected to the first connecting rod in a sliding manner, and a stirring plate is fixedly provided on each second slider.

The stirring plate is provided with a first gear ring and a second gear ring which are rotationally connected to the stirring plate, a side wall of the slide rod is provided with external threads, and an inner annular surface of the first gear ring is provided with internal threads which match the external threads for rotating. An upper end surface of the first gear ring is provided with a first stirring rod, teeth provided on an outer annular surface of the second gear ring are meshed with teeth provided on an outer annular surface of the first gear ring, and an inner annular surface of the second gear ring is provided with a second stirring rod.

A bottom surface of the ultrasonic treatment chamber is provided with a first liquid outlet pipe for discharging sludge. The first liquid outlet pipe is provided with a valve, a side wall of the ultrasonic treatment chamber is provided with multiple ultrasonic generators for performing disintegration treatment one sludge cells, and the top surface of the ultrasonic treatment chamber is provided with a liquid inlet pipe.

By using the micropore ultrasonic disintegration device, the first stirring mechanism and the second stirring mechanism are arranged in the ultrasonic treatment chamber to cooperate with each other, such that the sludge during the cell disintegration treatment process can be quickly and sufficiently stirred, the propagation efficiency of the ultrasonic waves in the sludge is increased, and the treatment efficiency of the sludge is increased. Meanwhile, the first gear ring and the second gear ring provided on the stirring plate are driven by the stirring plate to rotate, then the first stirring rod and the second stirring rod are driven to rotate, and thus the stirring efficiency of the second stirring mechanism for the sludge is further increased.

Further, a lower part of the side wall of the ultrasonic treatment chamber is provided with a first opening, and an inner wall of the ultrasonic treatment chamber is provided with a switch mechanism for controlling the opening or closing of the first opening.

In order to balance the treatment effect and treatment duration of the sludge, when the sludge passes through the ultrasonic treatment chamber, the way of enabling the sludge to flow in from an inlet and then flows out directly from an outlet is generally adopted. If it is necessary to keep the sludge in the ultrasonic treatment chamber, the only way that can be used is to reduce the size of the sludge outlet or increase a sludge injection rate. However, in the first way, the sludge outlet is often blocked because the sludge outlet is small, which affects the efficiency of the sludge cell disintegration treatment. While in the second way, it is difficult to control a flow rate of the sludge. With above arrangement, the discharge of sludge can be controlled in linkage, the residence time of the sludge in the ultrasonic treatment chamber is increased, and the sludge cell disintegration treatment can be more sufficient.

Further, a rubber ring is sleeved on the reciprocating lead screw above the stirring blades.

The above arrangement can prevent the situation that the service life of the stirring blades, the reciprocating lead screw and the first slider are affected as the stirring blades are directly impacted by the first slider, while providing the function of damping for the first slider.

Further, the stirring plate is arranged at an angle of 90° with the slide rod, and each of the multiple stirring blades is arranged at an included angle of 30° with a horizontal plane.

With the above arrangement, the sludge can be guided to the stirring blades along the stirring plate during the process that the stirring plate moves up and down, which increases the stirring efficiency of the first stirring mechanism for the sludge. By arranging the multiple stirring blades at an angle of 30°, the resistance of the sludge to the stirring blades during the stirring process can be reduced, and the stirring efficiency of the sludge is increased.

Further, an upper part of the side wall of the ultrasonic treatment chamber is provided with a second opening, and the first opening is connected to the second opening through a return pipe. The return pipe is provided with a sludge pump, and the sludge pump is fixedly provided on the side wall of the ultrasonic treatment chamber through a connecting rod.

With above arrangement, the sludge after ultrasonic treatment can be returned, and the sludge can be subjected to secondary ultrasonic treatment, which makes the sludge cell disintegration treatment more comprehensive and increases the treatment efficiency of the sludge.

Further, the baffle plate is provided with a counterweight block for assisting the baffle plate to close the first opening.

The above arrangement can assist the baffle plate to fall to block the sludge, thus avoiding the problem of incomplete closure of the first opening caused by large sludge resistance during the falling of the baffle plate.

Further, the lower part of the side wall of the ultrasonic treatment chamber is provided with a third opening opposite to the first opening, and the third opening is provided with the switch mechanism which cooperates with the first connecting rod to control the opening or closing of the third opening.

With above arrangement, the up-down movement of the first connecting rod can be used to control the opening and closing of the switch mechanism, thus controlling the circulation of sludge and reducing the working burden of workers.

Further, the switch mechanism includes a baffle plate connected to the inner wall of the ultrasonic treatment chamber in a sliding manner, the inner wall of the ultrasonic treatment chamber is provided with a second connecting rod which enables the baffle plate to slide by using the first connecting rod to press down. One end of the second connecting rod is hinged with the baffle plate, and a middle part of the second connecting rod is hinged with the inner wall of the ultrasonic treatment chamber through a rotating shaft.

With above arrangement, the first connecting rod can presses down one end of the second connecting rod when moving downwards. Under the action of the rotating shaft at the middle part of the second connecting rod, the other end of the second connecting rod can drive the hinged baffle plate to move upwards, so as to open the first opening and the third opening.

Further, the side wall of the ultrasonic treatment chamber at the third opening is provided with a first flow guide pipe inclined to a ground side, a sedimentation tank is provided below the first flow guide pipe, and a second flow guide pipe communicating with the sedimentation tank is provided at the middle part of a bottom surface of the first flow guide pipe.

A sealing block for controlling the sludge to pass through the second flow guide pipe intermittently is provided in the first flow guide pipe, the sealing bock is hermetically connected to the first flow guide pipe in a sliding manner, and the sealing block is connected to the side wall of the ultrasonic treatment chamber through at least one spring.

With above arrangement, the sludge after cell disintegration treatment can be settled. By providing the sealing block in the first flow guide pipe, the sludge can be controlled to flow into the sedimentation tank intermittently, and the residence time of the sludge in the ultrasonic treatment chamber is increased.

Further, the end, away from the third opening, of the first flow guide pipe is provided with a third flow guide pipe communicating with the sedimentation tank. A top surface of the first flow guide pipe corresponding to the position of the third flow guide pipe is provided with an agent delivery pipe communicating with the inside of the first flow guide pipe. An upper end of the agent delivery pipe is provided with an agent tank, a lower part of a side surface at one side of the sedimentation tank is provided with a second liquid outlet pipe, and the second liquid outlet pipe is provided with a valve.

With above arrangement, when the sealing block controls the sludge to enter the sedimentation tank intermittently, the agent tank can also be controlled to deliver sedimentation agent to the sedimentation tank intermittently, thus saving the use cost of the sedimentation agent. Moreover, after the sludge has fully settled, the valve can be opened to recover the treated sludge.

The present disclosure has the following beneficial effects.

(1) In accordance with the micropore ultrasonic disintegration device, the first stirring mechanism and the second stirring mechanism are arranged in the ultrasonic treatment chamber to cooperate with each other, such that the sludge during the cell disintegration treatment process can be quickly and sufficiently stirred, the propagation efficiency of the ultrasonic waves in the sludge is increased, and the treatment efficiency of the sludge is increased. Meanwhile, the first gear ring and the second gear ring provided on the stirring plate are driven by the stirring plate to rotate, then the first stirring rod and the second stirring rod are driven to rotate, and thus the stirring efficiency of the second stirring mechanism for the sludge is further increased.

(2) In accordance with the micropore ultrasonic disintegration device, the up-down movement of the first connecting rod is used to drive the switch mechanism to control the intermittent outflow of the sludge, the residence time of the sludge in the ultrasonic treatment chamber is increased, the efficiency of sludge cell disintegration is increased, and thus the sludge cell disintegration is more sufficient.

(3) In accordance with the micropore ultrasonic disintegration device, the sedimentation tank can be provided to perform secondary sedimentation treatment on the sludge after cell disintegration, such that the efficiency of sludge cell disintegration treatment is increased, and the impact of sludge discharge on the environment is reduced. With the arrangement of the first flow guide pipe, the second flow guide pipe and the sealing block, the sludge can be controlled to flow into the sedimentation tank intermittently, such that the sedimentation time of the sludge in the sedimentation tank is increased, and the sedimentation efficiency of the sludge is increased.

(4) In accordance with the micropore ultrasonic disintegration device, by providing the agent delivery pipe at one end of the first flow guide pipe, the agent tank can be controlled to intermittently deliver settling agent to the sedimentation tank, while the sealing block is used to guide the sludge intermittently, thus saving the use cost of the settling agent.

In the drawings: 1—ultrasonic treatment chamber, 11—liquid inlet pipe, 12—first liquid outlet pipe, 2—first stirring mechanism, 21—reciprocating lead screw, 22—stirring blade, 23—first slider, 24—first connecting rod, 25—rubber ring, 3—second stirring mechanism, 31—connecting block, 32—slide rod, 33—second slider, 34—stirring plate, 35—first gear ring, 351—first stirring rod, 36—second gear ring, 361—second stirring rod, 4—switch mechanism, 41—baffle plate, 42—second connecting rod, 5—ultrasonic generator, 6—return pipe, 61—sludge pump, 7—driving mechanism, 8—first flow guide pipe, 81—second flow guide pipe, 82—sealing block, 83—agent delivery pipe, 84—agent tank, 85—third flow guide pipe, 9—sedimentation tank, 91—second liquid outlet pipe.

DETAILED DESCRIPTION OF THE EMBODIMENTS

The present disclosure is further described below with reference to the accompanying drawings and embodiments, so as to reflect the advantages of the present disclosure better.

Embodiment 1

Figure 1:
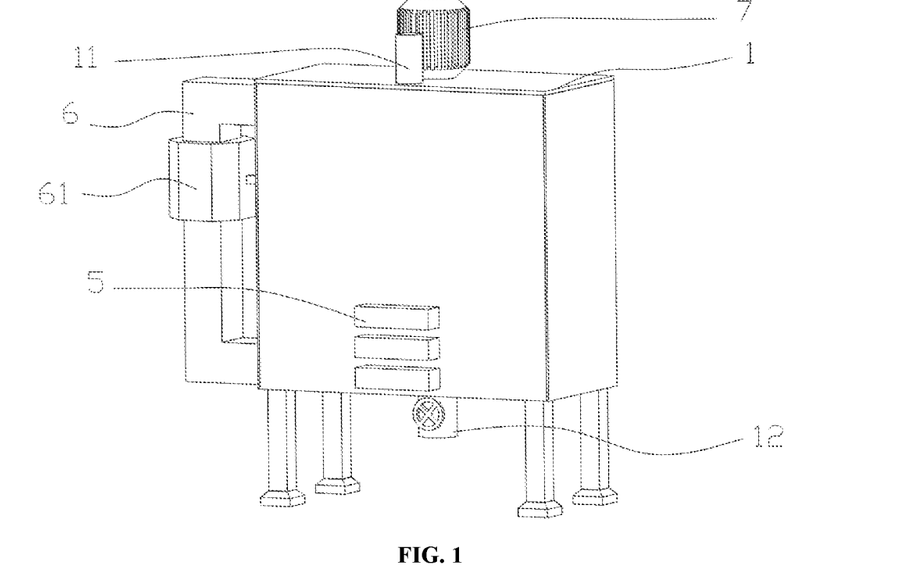
FIG. 1 is a schematic diagram of an overall structure of an ultrasonic disintegration device in accordance with a first embodiment of the present disclosure.
Figure 2:
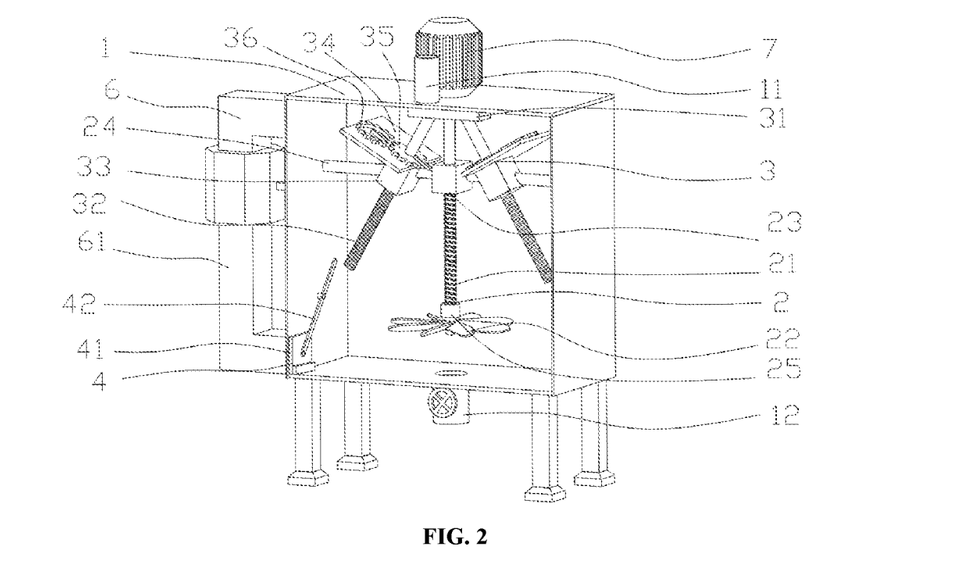
FIG. 2 is a partial sectional view of the ultrasonic disintegration device according to the first embodiment of the present disclosure.

As shown in FIGS. 1 and 2, a micropore ultrasonic disintegration device for sludge cell disintegration includes an ultrasonic treatment chamber 1. The ultrasonic treatment chamber 1 is internally provided with a first stirring mechanism 2, and a driving mechanism 7 is provided on an outer top surface of the ultrasonic treatment chamber 1. The first stirring mechanism 2 includes a reciprocating lead screw 21 provided in a vertical direction, the reciprocating lead screw 21 is provided with reciprocating threads that intersect with each other. One end of the reciprocating lead screw 21 penetrates through a top surface of the ultrasonic treatment chamber 1 and is connected to an output shaft of the driving mechanism 7. The driving mechanism is a commercially available motor, and the other end of the reciprocating lead screw 21 is provided with eight stirring blades 22. Each of the eight stirring blades 22 is arranged at an included angle of 30° with a horizontal plane. A first slider 23 is sleeved on the reciprocating lead screw 21 for sliding up and down in cooperation with the reciprocating lead screw 21. A rubber ring 25 is sleeved on the reciprocating screw rod 21 at 1 cm above the stirring blades 22. A bottom surface of the ultrasonic treatment chamber 1 is provided with a first liquid outlet pipe 12 for discharging sludge, and the first liquid outlet pipe 12 is provided with a valve. Six mutually symmetrical ultrasonic generators 5 are arranged on a side wall of the ultrasonic treatment chamber 1. The ultrasonic generator is a commercially available HS-4SH-5028 ultrasonic generator, and a top surface of the ultrasonic treatment chamber 1 is provided with a liquid inlet pipe 11.

Figure 3:
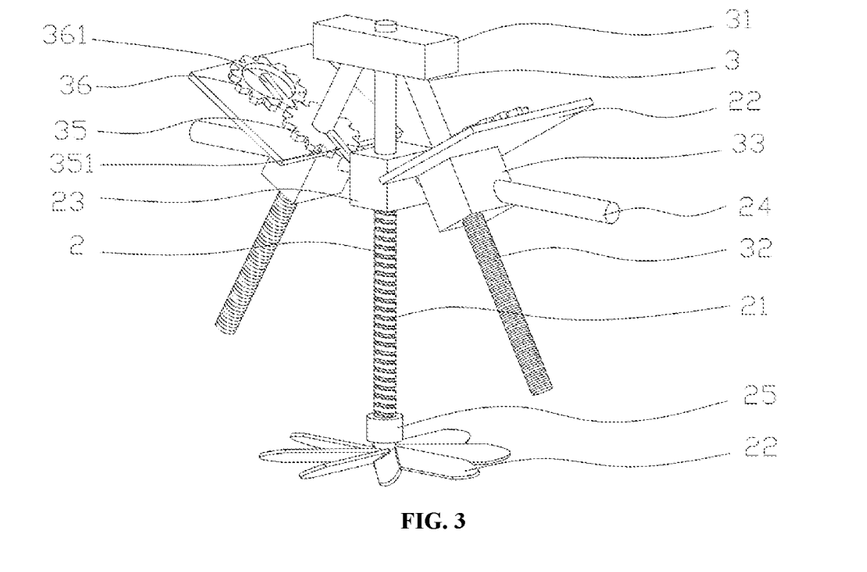
FIG. 3 is a structural schematic diagram of a first stirring mechanism and a second stirring mechanism of the ultrasonic disintegration device in accordance with the present disclosure.

As shown in FIGS. 1 and 3, the ultrasonic treatment chamber 1 is internally provided with a second stirring mechanism 3. The second stirring mechanism 3 includes a connecting block 31 fixedly provided on an inner top surface of the ultrasonic treatment chamber 1, the connecting block 31 is provided with two slide rods which are symmetrically arranged with the reciprocating lead screw 21 as a symmetric axis. Each slide rod 32 is arranged at an included angle of 30° with the reciprocating lead screw 21, and a second slider 33 is sleeved on the slide rod 32.

A first connecting rod 24 is fixedly provided on the first slider 23 in a horizontal direction, and two second sliders 33 are connected to the first connecting rod 24 in a sliding manner. A stirring plate 34 is fixedly provided on each second slider 33, and the stirring plate 34 is arranged at an angle of 90° with the slide rod 32.

The stirring plate 34 is provided with a first gear ring 35 and a second gear ring 36 which are rotationally connected to the stirring plate 34. The rotational connection is specifically that the stirring plate 34 is provided with an annular groove, a lower end surface of the first gear ring 35 and a lower end surface of a second gear ring 36 are both provided with a retaining ring rotationally clamped to the annular groove. A side wall of the slide rod 32 is provided with external threads, an inner annular surface of the first gear ring 35 is provided with internal threads which match the external threads for rotating. An upper end surface of the first gear ring 35 is provided with a first stirring rod 351, teeth provided on an outer annular surface of the second gear ring 36 are meshed with teeth provided on an outer annular surface of the first gear ring 35, and an inner annular surface of the second gear ring 36 is provided with a second stirring rod 361.

Figure 4:
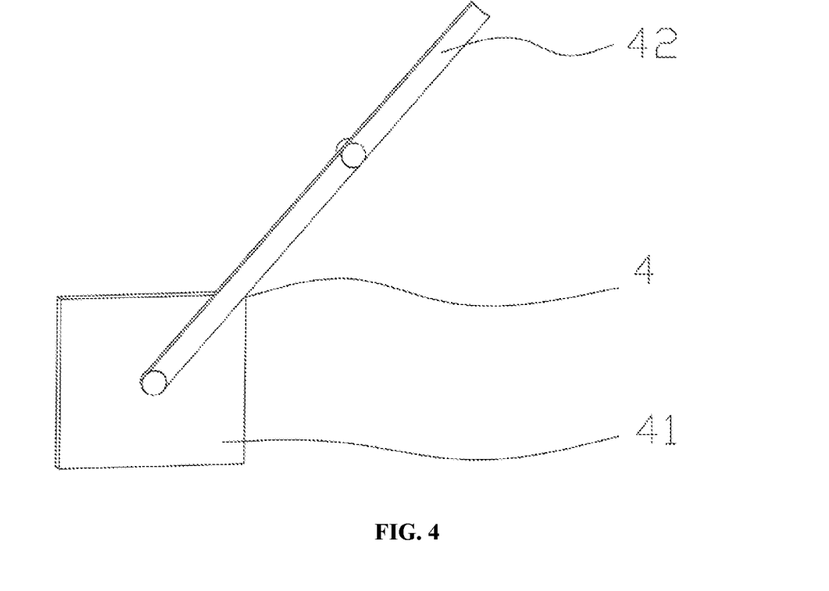
FIG. 4 is a structural schematic diagram of a switch mechanism of the ultrasonic disintegration device in accordance with the present disclosure.

As shown in FIGS. 1 and 4, a lower part of a side wall of the ultrasonic treatment chamber 1 is provided with a first opening, and an inner wall of the ultrasonic treatment chamber 1 is provided with a switch mechanism 4 for controlling the opening or closing of the first opening. The switch mechanism 4 includes a baffle plate 41 connected to the inner wall of the ultrasonic treatment chamber 1 in a sliding manner. The sliding connection is specifically that the inner wall of the ultrasonic treatment chamber 1 is provided with a sliding groove, the baffle plate 41 is provided with a clamping strip clamped into the sliding groove in a sliding manner. The baffle plate 41 is provided with a counterweight for assisting the baffle plate 41 to close the first opening. The inner wall of the ultrasonic treatment chamber 1 is provided with a second connecting rod 42 which enables the baffle plate 41 to slide by using first connecting rod 24 to press down. A left end of the second connecting rod 42 is hinged with the baffle plate 41, and a middle part of the second connecting rod 42 is hinged with the inner wall of the ultrasonic treatment chamber 1 through a rotating shaft.

As shown in FIG. 1, an upper part of the side wall of the ultrasonic treatment chamber 1 is provided with a second opening, and the first opening is connected to the second opening through a return pipe 6. The return pipe 6 is provided with a sludge pump 61, and the sludge pump 61 is fixedly provided on the side wall of the ultrasonic treatment chamber 1 through a connecting rod.

A use method of the micropore ultrasonic disintegration device is as follows.

First, sludge is injected into an ultrasonic treatment chamber 1 through a liquid inlet pipe 11, a driving mechanism 7 is turned on to drive a reciprocating lead screw 21 to rotate. The reciprocating screw 21 drives the eight stirring blades 22 provided at a bottom end of the reciprocating screw 21 to rotate, the stirring blades 22 drive the sludge to form a whirlpool.

When the reciprocating lead screw 21 rotates, a first slider 23 moves downwards along the reciprocating lead screw 21. The first slider 23 drives a first connecting rod 24 to move downwards while moving downwards. The first connecting rod 24 drives two second sliders 33 to move downwards along two slide rods 32, respectively. When the second sliders 33 move downwards along the slide rods 32, the second sliders 33 move to a left side and a right side along the first connecting rod 24, respectively. Meanwhile, the second sliders 33 drive stirring plates 34 to move downwards, and each stirring plate 34 drive a first gear ring 35 and a second gear ring 36 to move downwards while moving downwards. The first gear ring 35 drives the first stirring rod 351 to rotate forwards under the action of external threads provided on the slide rod 32; meanwhile, the first gear ring 35 drives the second gear ring 36 to rotate reversely, thus enabling the second stirring rod 361 to rotate reversely. When the first slider 23 moves to make contact with a rubber ring 25, under the cooperation of the reciprocating lead screw 21 and the first slider 23, the first slider 23 drives the first connecting rod 24 to move upwards. The principle is the same as above, during the stirring, ultrasonic generators 5 are turned on to perform sludge cell disintegration treatment on the sludge.

When the first connecting rod 24 moves downwards, the first connecting rod 24 presses downwards a right end of a second connecting rod 42 to enable the second connecting rod 42 to swing with a rotating shaft as the center of the circle, thereby lifting a baffle plate 41 in a circular path of the second connecting rod 42, and at the moment, the first opening is opened.

When the first opening is opened, a return pipe 6 communicates with the ultrasonic treatment chamber 1, a sludge pump 61 is used to pump the sludge in the ultrasonic treatment chamber 1 into the return pipe 6. Under the action of the sludge pump 61, the sludge is injected into the ultrasonic treatment chamber 1 from a second opening 62 through the return pipe 6 for sludge cell disintegration treatment. After the sludge in the ultrasonic treatment chamber 1 is subjected to the sludge cell disintegration treatment for a period of time, a valve on a first liquid outlet pipe 12 is opened to discharge the sludge on which the sludge cell disintegration treatment has been carried out for collection and discharge.

Embodiment 2

Figure 5:
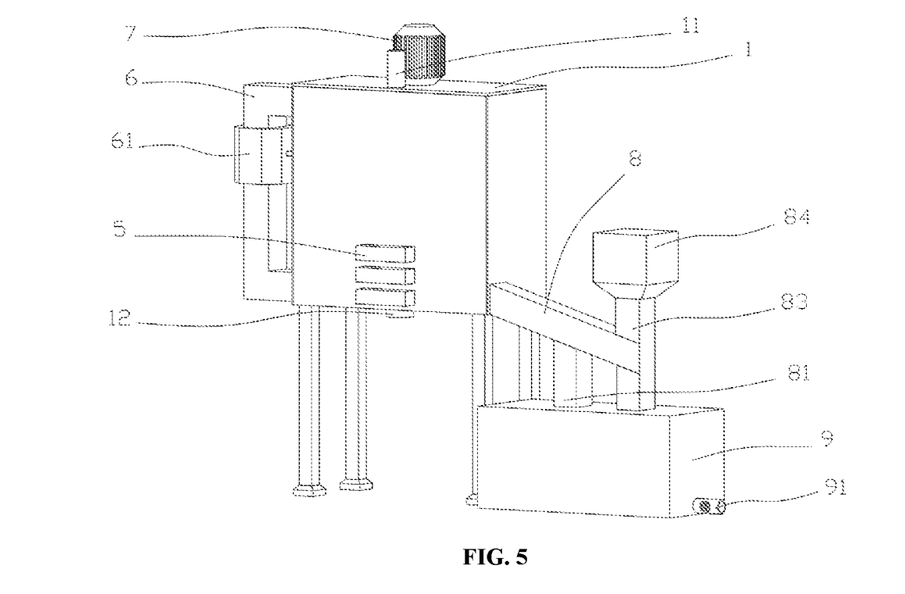
FIG. 5 is a schematic diagram of an overall structure of an ultrasonic disintegration device in accordance with a second embodiment of the present disclosure.
Figure 6:
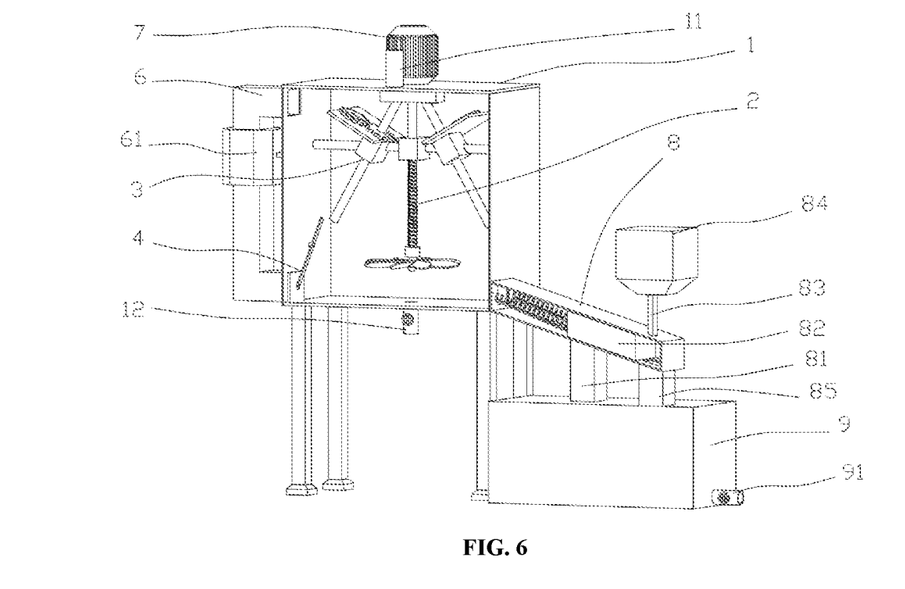
FIG. 6 is a partial sectional view of the ultrasonic disintegration device according to the second embodiment of the present disclosure.
Figure 7:
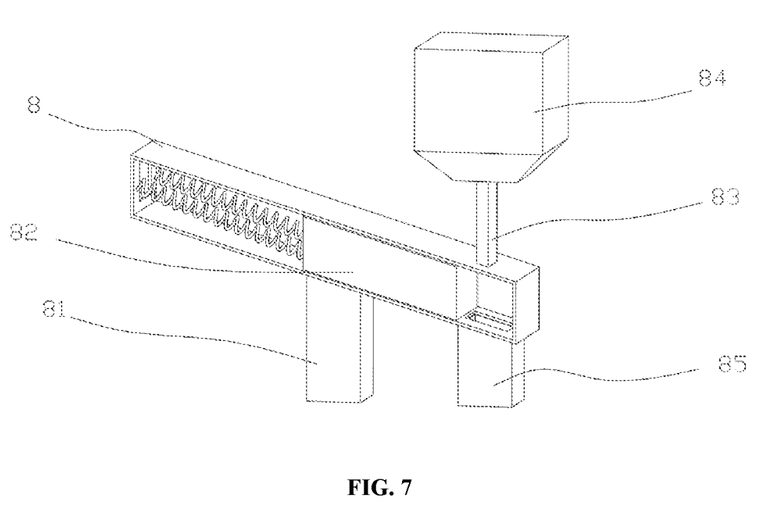
FIG. 7 is a partial sectional view of a first flow guide pipe of the ultrasonic disintegration device according to the second embodiment of the present disclosure.

The difference between this embodiment and Embodiment 1 is that as shown in FIGS. 5 to 7, a lower part of a right side wall of the ultrasonic treatment chamber is provided with a third opening opposite to the first opening, and the third opening is provided with a switch mechanism 4 which cooperates with the first connecting rod 24 to control the opening or closing of the third opening.

The side wall of the ultrasonic treatment chamber 1 at the third opening is provided with a first flow guide pipe 8 inclined to a ground side, a sedimentation tank 9 is provided below the first flow guide pipe 8, and a second flow guide pipe 81 communicating with the sedimentation tank 9 is provided at a middle part of a bottom surface of the first flow guide pipe 8.

A sealing block 82 for controlling the sludge to pass through the second flow guide pipe 81 intermittently is provided in the first flow guide pipe 8, the sealing block 82 is hermetically connected to the first flow guide pipe 8 in a sliding manner, and the sealing block 82 is connected to the side wall of the ultrasonic treatment chamber 1 through two springs.

The end, away from the third opening, of the first flow guide pipe 8 is provided with a third flow guide pipe 85 communicating with the sedimentation tank 9. A top surface of the first flow guide pipe 8 corresponding to the position of the third flow guide pipe 85 is provided with an agent delivery pipe 83 communicating with the inside of the first flow guide pipe 8. An upper end of the agent delivery pipe 83 is provided with an agent tank 84, a lower part of a side surface at a right side of the sedimentation tank 9 is provided with a second liquid outlet pipe 91, and the second liquid outlet pipe 91 is provided with a valve.

A use method of a sorting treatment device of this embodiment is as follows: on the basis of Embodiment 1, when the first connecting rod 24 moves downwards, a right end of the first connecting rod 24 presses the second connecting rod 42 downwards to make the second connecting rod 42 swing with a rotating shaft as the center of the circle, thus lifting the baffle plate 41 in a circular path of the second connecting rod 42, and at the moment, the third opening is opened. When the third opening is opened, the first flow guide pipe 8 communicates with the ultrasonic treatment chamber 1, and the sludge flows into the first flow guide pipe 8. When the sludge flows into the first flow guide pipe 8, due to the action of gravity, the sludge presses the sealing block 82 to overcome an elastic force and slide downwards along the first flow guide pipe 8. When the sealing block 82 slides along the first flow guide pipe 8, the first flow guide pipe 8 communicates with the second flow guide pipe 81, such that the sludge can flow into the sedimentation tank 9. Meanwhile, a commercially available flocculant is added into the agent tank 84. When the baffle plate 41 falls to close the third opening, the sludge in the first flow guide pipe 8 flows into the sedimentation tank 9 along the second flow guide pipe 81. At the moment, the sealing block 82 re-closes the opening through which the first flow guide pipe 8 communicates with the second flow guide pipe 81 under the action of the spring. At the moment, the flocculant in the agent tank 84 flows into the sedimentation tank 9 along the agent delivery pipe 83. When the sludge is stirred by the first stirring mechanism 2 and the second stirring mechanism 3, the sealing block 82 repeats the above operation in the sedimentation tank. After the sludge in the sedimentation tank 9 is settled for a period of time, the valve on the second liquid outlet pipe 91 is opened to discharge the settled sludge for collection and discharge.

What is claimed is:

1. A micropore ultrasonic disintegration device for sludge cell disintegration, comprising:

an ultrasonic treatment chamber (1), wherein the ultrasonic treatment chamber (1) is internally provided with a first stirring mechanism (2), and a driving mechanism (7) is provided on an outer top surface of the ultrasonic treatment chamber (1); the first stirring mechanism comprises a reciprocating lead screw (21) provided in a vertical direction, one end of the reciprocating lead screw (21) penetrates through a top surface of the ultrasonic treatment chamber (1) and is connected to an output shaft of the driving mechanism (7), and an other end of the reciprocating lead screw (21) is provided with a plurality of stirring blades (22); and a first slider (23) is sleeved on the reciprocating lead screw (21) for sliding up and down in cooperation with the reciprocating lead screw (21);

the ultrasonic treatment chamber (1) is internally provided with a second stirring mechanism (3), the second stirring mechanism (3) comprises a connecting block (31) fixedly provided on an inner top surface of the ultrasonic treatment chamber (1), the connecting block (31) is provided with two slide rods which are symmetrically arranged with the reciprocating lead screw (21) as a symmetric axis; each of the two slide rod (32) is arranged at an included angle of 30° with the reciprocating lead screw (21), and a second slider (33) is sleeved on the slide rod (32);

a first connecting rod (24) is fixedly provided on the first slider (23) in a horizontal direction, two second sliders (33) are connected to the first connecting rod (24) in a sliding manner, and a stirring plate (34) is fixedly provided on each second slider (33);

the stirring plate (34) is provided with a first gear ring (35) and a second gear ring (36) which are rotationally connected to the stirring plate (34), a side wall of the slide rod (32) is provided with external threads, an inner annular surface of the first gear ring (35) is provided with internal threads which match the external threads for rotating, an upper end surface of the first gear ring (35) is provided with a first stirring rod (351), teeth provided on an outer annular surface of the second gear ring (36) are meshed with teeth provided on an outer annular surface of the first gear ring (35), and an inner annular surface of the second gear ring (36) is provided with a second stirring rod (361);

wherein a lower part of the side wall of the ultrasonic treatment chamber (1) is provided with a first opening, and an inner wall of the ultrasonic treatment chamber (1) is provided with a switch mechanism (4) for controlling the opening or closing of the first opening, wherein an upper part of the side wall of the ultrasonic treatment chamber (1) is provided with a second opening, the first opening is connected to the second opening through a return pipe (6), the return pipe (6) is provided with a sludge pump (61), and the sludge pump (61) is fixedly provided on the side wall of the ultrasonic treatment chamber (1) through a connecting rod, wherein the lower part of the side wall of the ultrasonic treatment chamber (1) is provided with a third opening opposite to the first opening, and the third opening is provided with an other switch mechanism (4) which cooperates with the first connecting rod (24) to control an opening or closing of the third opening, wherein the switch mechanism (4) comprises a baffle plate (41) connected to the inner wall of the ultrasonic treatment chamber (1) in a sliding manner, the baffle plate (41) of the switch mechanism is provided with a counterweight for assisting the baffle plate (41) to close the first opening, the baffle plate (41) of the other switch mechanism is provided with an other counterweight for assisting the baffle plate (41) to close the third opening, the inner wall of the ultrasonic treatment chamber (1) is provided with a second connecting rod (42) which enables the baffle plate (41) to slide by using the first connecting rod (24) to press down, one end of the second connecting rod (42) is hinged with the baffle plate (41), and a middle part of the second connecting rod (42) is hinged with the inner wall of the ultrasonic treatment chamber (1) through a rotating shaft, wherein the side wall of the ultrasonic treatment chamber (1) at the third opening is provided with a first flow guide pipe (8) inclined to a ground side, a sedimentation tank (9) is provided below the first flow guide pipe (8), and a second flow guide pipe (81) communicating with the sedimentation tank (9) is provided at a middle part of a bottom surface of the first flow guide pipe (8);

a sealing block (82) for controlling the sludge to pass through the second flow guide pipe (81) intermittently is provided in the first flow guide pipe (8), the sealing bock (82) is hermetically connected to the first flow guide pipe (8) in a sliding manner, and the sealing block (82) is connected to the side wall of the ultrasonic treatment chamber (1) through at least one spring, and wherein the end, away from the third opening, of the first flow guide pipe (8) is provided with a third flow guide pipe (85) communicating with the sedimentation tank (9), a top surface of the first flow guide pipe (8) corresponding to a position of the third flow guide pipe (85) is provided with a chemical agent delivery pipe (83) communicating with the inside of the first flow guide pipe (8), an upper end of the chemical agent delivery pipe (83) is provided with a chemical agent tank (84), a lower part of a side surface at one side of the sedimentation tank (9) is provided with a second liquid outlet pipe (91), and the second liquid outlet pipe (91) is provided with a valve; and a bottom surface of the ultrasonic treatment chamber (1) is provided with a first liquid outlet pipe (12) for discharging sludge, the first liquid outlet pipe (12) is provided with a valve, a side wall of the ultrasonic treatment chamber (1) is provided with a plurality of ultrasonic generators (5) for preforming disintegration treatment on sludge cells, and the top surface of the ultrasonic treatment chamber (1) is provided with a liquid inlet pipe (11).

2. The micropore ultrasonic disintegration device for sludge cell disintegration according to claim 1, wherein a rubber ring (25) is sleeved on the reciprocating lead screw (21) above the stirring blades (22).

3. The micropore ultrasonic disintegration device for sludge cell disintegration according to claim 1, wherein the stirring plate (34) is arranged at an angle of 90° with the slide rod (32), and each of the plurality of stirring blades (22) is arranged at an included angle of 30° with a horizontal plane.

* * * * *